United States Patent [19]

Berthold et al.

[11] Patent Number: 5,196,754

[45] Date of Patent: Mar. 23, 1993

[54] PIEZOELECTRIC TONE GENERATOR AND A PROCESS FOR PRODUCING IT

[75] Inventors: Heinrich Berthold, Erlangen; Thomas Uhl, Selb; Kurt Handschuh, Eckental; Georg Wiesend, Henfenfeld, all of Fed. Rep. of Germany

[73] Assignee: Hoechst CeramTec Aktiengesellschaft, Self, Fed. Rep. of Germany

[21] Appl. No.: 697,996

[22] Filed: May 10, 1991

[30] Foreign Application Priority Data

May 12, 1990 [DE] Fed. Rep. of Germany ....... 4015253

[51] Int. Cl.$^5$ .............................................. H01L 41/08
[52] U.S. Cl. .................................... 310/324; 310/321; 310/322; 310/323; 310/328; 29/25.35
[58] Field of Search ................................ 310/321–324, 310/328; 29/25.35

[56] References Cited

U.S. PATENT DOCUMENTS

| | | | |
|---|---|---|---|
| 2,589,403 | 3/1952 | Kurie ................................ | 29/25.35 |
| 3,359,435 | 12/1967 | Webb . | |
| 3,453,458 | 7/1969 | Curran et al. ........................ | 310/344 |
| 3,746,898 | 7/1973 | Austin et al. ........................ | 310/324 |
| 4,118,649 | 10/1978 | Shwartzman et al. ............... | 310/337 |
| 4,229,812 | 10/1980 | Holloway ............................ | 310/328 |
| 4,240,002 | 12/1980 | Tosi et al. ............................ | 310/322 |
| 4,295,009 | 10/1981 | Weidler ............................... | 310/324 |
| 4,368,400 | 1/1983 | Taniguchi et al. .................. | 310/322 |
| 4,511,821 | 4/1985 | Nakamura et al. ................. | 310/354 |
| 4,583,017 | 4/1986 | Nakamura et al. . | |
| 4,666,547 | 5/1987 | Snowden et al. .................... | 310/321 |
| 4,684,538 | 8/1987 | Klemarczyk ........................ | 427/54.1 |
| 4,712,098 | 12/1987 | Laing ................................... | 310/319 |
| 4,761,582 | 8/1988 | McKee ................................ | 310/322 |
| 4,825,116 | 4/1989 | Itoh et al. ............................ | 310/335 |

FOREIGN PATENT DOCUMENTS

| | | | |
|---|---|---|---|
| 2435910 | 2/1975 | Fed. Rep. of Germany ...... | 310/324 |
| 2612563 | 9/1977 | Fed. Rep. of Germany ..... | 29/25.35 |
| 0178899 | 10/1984 | Japan ................................... | 29/25.35 |
| 0231384 | 9/1989 | Japan ................................... | 29/25.35 |

*Primary Examiner*—Mark O. Budd
*Assistant Examiner*—Thomas M. Dougherty
*Attorney, Agent, or Firm*—Foley & Lardner

[57] ABSTRACT

To produce a piezoelectric tone generator, a layer of filler-free bonding agent whose dynamic viscosity is 800 to 18,000 mPa·s is applied between a metallized carrier plate and a piezoceramic wafer. The package composed of carrier plate, bonding layer and ceramic plate is pressed together, the quantity of bonding agent being chosen to be so large that during pressing a bead covering the edge of the ceramic wafer is formed. The bonding layer is cured thereafter, firstly catalytically or thermally and then by UV irradiation.

20 Claims, 1 Drawing Sheet

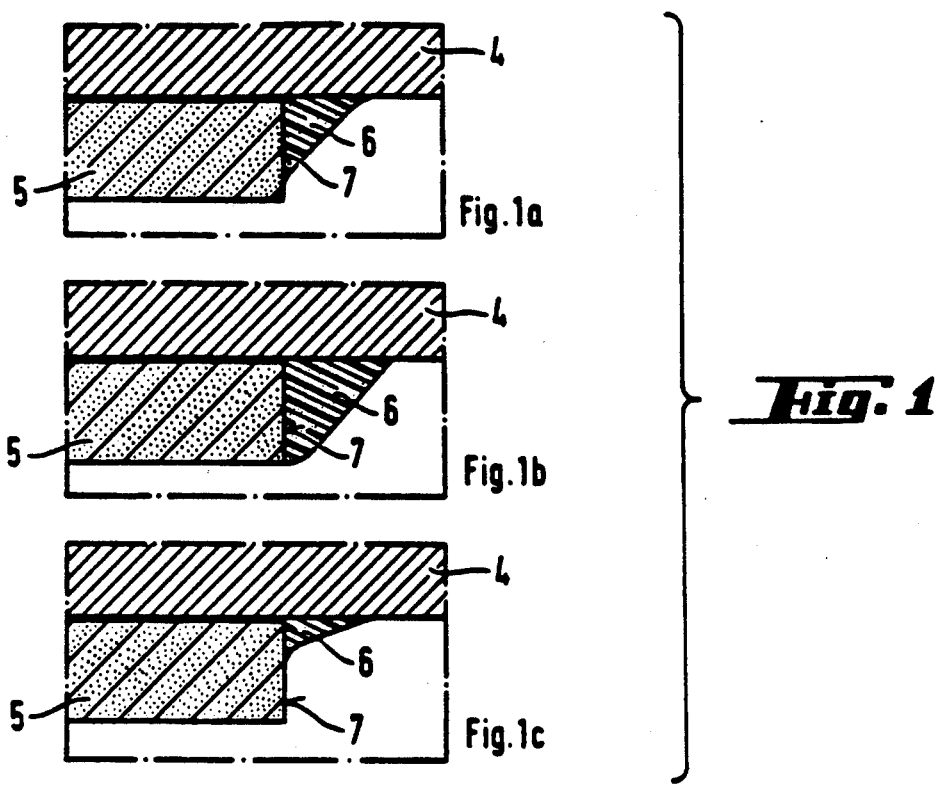
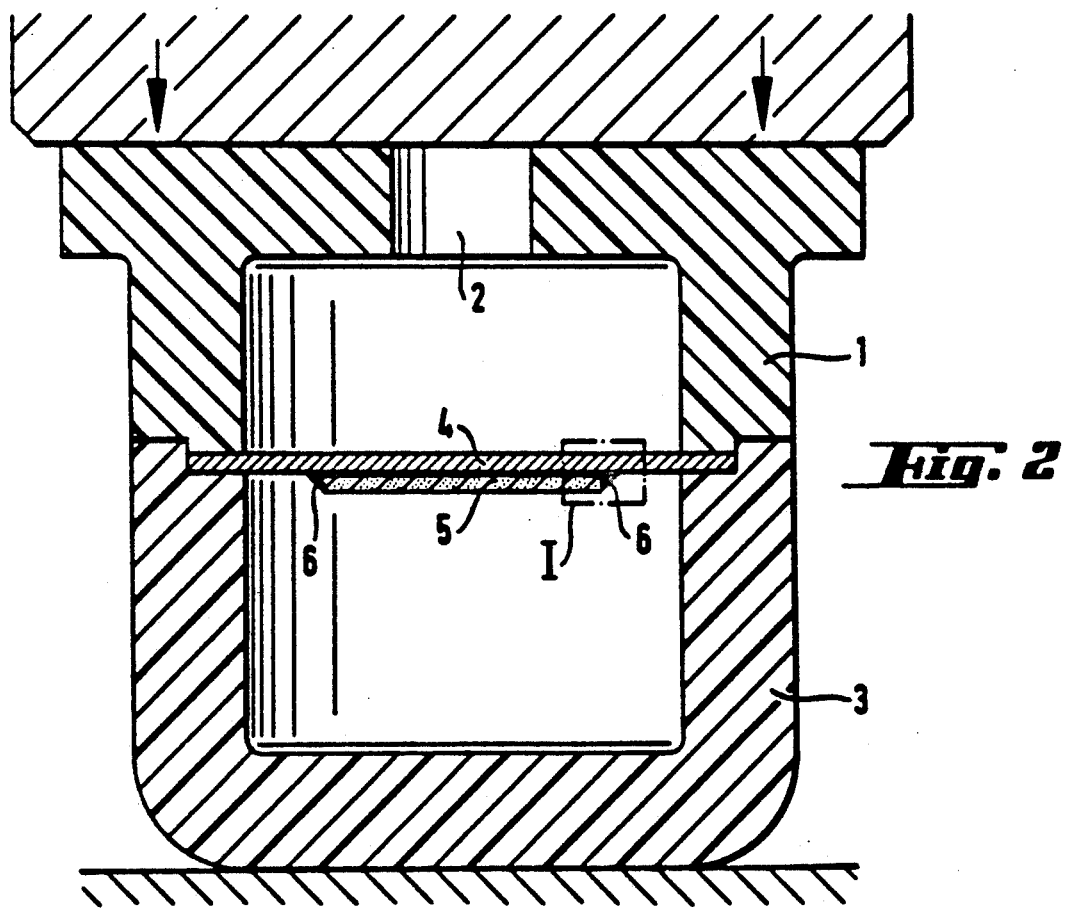
Fig. 1
Fig. 2

PIEZOELECTRIC TONE GENERATOR AND A PROCESS FOR PRODUCING IT

BACKGROUND OF THE INVENTION

The invention relates to an ultrasonic weld-resistant piezoelectric tone generator comprising a piezoelectric ceramic wafer bonded onto a metallic carrier plate, a process for producing it, and its installation in a piezo tone generator housing.

It is already known to produce piezoelectric tone generators by bonding a piezoelectric ceramic plate onto a metal plate.

In most applications, piezoelectric tone generators of the said type are installed in a housing in order to increase the achievable sound pressure level or to achieve a specific resonance behavior.

The installation generally takes place in this regard either by bonding-in or by clamping with the aid of spring washers. The washers can serve simultaneously for contacting, no special mechanical loads occurring in this case on the tone generator.

However, ultrasonic welding has proved to be a particularly rational and reliable production method in the case of the installation of plastic housings. In this process, two half-housings of plastic are fused together on their contact surfaces. The heat required is generated as friction heat at the interfaces by means of ultrasound. In the case of tone generator housings, the tone generator to be installed is simultaneously clamped during this process at its edge in the vicinity of the contact surfaces of the two half housings. In this process, it cannot be avoided that due to the vibrational energy applied to the plastic the tone generator is simultaneously excited to resonate and subjected in this way to a substantial load.

In tone generator elements produced according to the prior art, the ultrasonic welding leads in approx. 2% of cases to edge eruptions, cracks and thus to the functional incapacity of the piezoceramic.

SUMMARY OF THE INVENTION

The object therefore arose of finding a production process with which it is possible to produce piezoelectric tone generators that are so stable mechanically that they withstand being installed in plastic housings by means of ultrasonic welding without damage up to virtually 100%.

The object is achieved according to the invention when a layer of filler-free bonding agent whose dynamic viscosity is 800 to 18,000 mPa.s is applied between a metallized piezoceramic wafer and a somewhat larger carrier plate. The package composed of carrier plate, bonding layer and ceramic plate is then pressed together, the quantity of bonding agent being chosen to be so large that during pressing a bead covering the edge of the ceramic wafer is formed. The bonding layer is cured thereafter, firstly catalytically or thermally and then in the second stage by UV irradiation. According to the prior art, the bonding agent is applied by screen printing in a relatively low quantity and cured in one stage.

BRIEF DESCRIPTION OF THE DRAWINGS

FIG. 1 shows a partial view of a normal cut through a piezoelectric tone generator fixed with cured bonding agent onto a metal wafer.

FIG. 2 shows a view of a normal cut through a piezoelectric wafer embedded into a plastic housing.

DETAILED DESCRIPTION OF PREFERRED EMBODIMENTS

The piezoceramic wafer used is metallized on both sides. Its shape is not essential for the process. Possible examples are rectangular, triangular or regular ten-cornered wafers. Circular wafers are preferred. Their roughness $R_a$ is 0.5 to 2 $\mu$m. If the bonding layer used is approximately just as thick, there is electrical contact between the metallic carrier plate and the metallic coating of the piezoceramic wafer. If the bonding layer is thicker, the piezoceramic wafer cannot fulfil its function for lack of power supply.

The thickness of the piezo layer is preferably in the range between 100 $\mu$m and 300 $\mu$m. The thickness of the carrier plate of metal preferably between 50 and 400 $\mu$m The diameter of the piezo layer is preferably between 10 and 40 mm, the diameter of the carrier plate of metal preferably between 12 and 50 mm. It is advantageous if the diameter of the circular metal plate is larger by at least 2 mm and not more than 30 mm than the diameter of the circular piezoceramic wafer.

The package composed of carrier plate, bonding layer and ceramic plate is preferably pressed together with a pressure of 3 to 6 bar. The period of being pressed together is to be at least half a second. Pressing together for longer is not injurious.

Single-component bonding agents, for example a methacrylate resin, in particular a urethane methacrylate resin, are suitable as bonding agents for the filler-free bonding layer.

The bonding agent used cures particularly rapidly in narrow gaps. If it is cured in only one stage (i.e. thermally or catalytically), the ceramic does adhere to the metal, but the bead is not completely cured and therefore still tacky. A fully cured bead with a dry surface is obtained by additional treatment with the aid of UV irradiation.

The piezoelectric tone generators according to the invention are very stable mechanically. Ceramic particles do not flake off, particularly in the edge zones, even under the action of ultrasound. This is advantageous since the two halves of a tone generator housing serving as a resonator are normally welded with the aid of ultrasound. Tone generators produced according to the prior art suffer partly (approx. 2% of cases) from edge eruptions on the ceramic wafer due to the ultrasonic welding technique, and thus become unusable. This does not apply to the piezoelectric tone generators according to the invention.

Measurements have shown that the bead of bonding agent has no attendant acoustic disadvantages. However, it has a stabilizing effect on the tone generator element mechanically and in term of production and engineering.

The invention is explained in more detail by the example.

EXAMPLE 0.02 g of a urethane methacrylate bonding agent with a viscosity of approx. 1000 mPa.s is dosed into the center of a brass circle of diameter 46 mm.

A suitable piezoceramic circle of diameter 25 mm is now concentrically mounted, and the metal circle and ceramic are pressed together with the aid of a punch of diameter 24 mm and a pressure of 4.5 bar. In this process, the bonding agent is distributed in the gap between the two parts, and excess bonding agent forms a bead on the edge of the ceramic wafer. The bonding agent is dosed so that no bonding agent reaches the free surface of the ceramic.

The tone generator now passes through a combined curing section, which comprises a thermal and a UV radiation part. The bonding agent in the gap between the metal circle and ceramic wafer is cured in the thermal part at approximately 80° C.

The UV radiation part cures the bead of bonding agent both in depth (wavelengths between 300 and 400 nm) and on the surface (wavelengths below 300 nm).

The tone generator thus produced is distinguished by high mechanical stability, functions up to very high sound pressure levels, and is ultrasonic weld-resistant.

The piezoelectric tone generator according to the invention is particularly suitable for installation in a piezo tone generator housing of thermoplastic synthetic material. For this purpose, use is made of the two halves of a plastic resonator housing which have a circular edge in each case, the circular edge of one half having a recess for receiving the tone generator wafer and the circular edge, provided with a setoff, of the other half. A tone generator wafer produced according to the invention is inserted into the recess of one half of the housing, and then the other half of the housing is mounted on the half, so that the housing is closed. The tone generator wafer is thus clamped between the half-housings. The halves are then welded by the short-term action of ultrasound under slight pressure perpendicular to the wafer.

The connection of the plastics by ultrasound takes place through friction on the contact surface on the parts to be connected. The friction is generated by applying a vibrating tool, called a sonotrode, with a frequency of approximately 20 kHz perpendicularly to the surface of one of the parts to be connected.

A plurality of embodiments of the bead are represented in FIG. 1. The bead of cured bonding agent (6) is intended to cover the lateral surface (7) of the cylindrical piezoceramic wafer (5), which is bonded onto the metal wafer (4), to at least ⅔. Beads such as in FIGS. 1a and 1b are in accordance with the invention. By contrast, a bead such as in FIG. 1c, in which less than 50% of the lateral surface of the piezoceramic wafer is covered by a bonding agent, yields unreliable results.

FIG. 2 represents the arrangement of plastic halves and piezo wafers in the case of ultrasonic welding. The upper part 1 of the housing can have an exit opening (2) for the sound which is generated later by the piezoceramic. The metal wafer (4) with the ceramic layer (5) bonded on is clamped between the upper part 1 and lower part 3 of the housing.

We claim:
1. A process for producing a tone generator comprising the steps of:
 a) forming a layer of filler-free bonding agent having a dynamic viscosity of between 800 and 18,000 mPa-s between a metallized carrier plate and a metallized ceramic wafer,
 b) pressing together the carrier plate, bonding layer, and ceramic wafer,
 c) curing the bonding layer catalytically or thermally, and
 d) curing the bonding layer by UV irradiation,
 wherein the quantity of bonding layer applied in step a) is chosen so that during step b) a bead covering the edge of the ceramic wafer is formed.

2. A process according to claim 1, wherein said metallized ceramic wafer is a circular wafer having a roughness of 0.5 to 2 microns, wherein said carrier plate is circular, and wherein said metallized ceramic wafer has a smaller diameter than said carrier plate.

3. A process according to claim 1, wherein said metallized ceramic wafer is metallized on both sides and of a circular, rectangular, triangular or ten-cornered shape.

4. A process according to claim 1, wherein said ceramic wafer has a thickness of between 100 and 300 microns, and the thickness of said carrier plate is between 50 and 400 microns.

5. A process according to claim 2, wherein the diameter of said ceramic wafer is between 10 and 40 mm and the diameter of said carrier plate is between 12 and 50 mm, with the proviso that the diameter of said metal plate is between 2 and 30 mm larger than the diameter of said ceramic wafer.

6. A process according to claim 1, wherein step b) comprises pressing together the carrier plate, bonding layer and ceramic wafer, at a pressure of 3 to 6 bars.

7. A process according to claim 6, wherein step b) comprises pressing together the carrier plate, bonding layer and ceramic wafer, for at least half a second.

8. A process according to claim 1, wherein said bonding agent is a single-component bonding agent which comprises a methacrylate resin.

9. A process according to claim 8, wherein said methacrylate resins comprises a urethane methacrylate resin.

10. A process according to claim 1, wherein said bead covers at least 50% of the lateral surface of the ceramic wafer.

11. A process according to claim 1, wherein said bonding layer produced in step a) is adjacent to both the carrier plate and ceramic wafer.

12. A process according to claim 1, additionally comprising the step of
 e) welding by the use of ultrasound two halves of a housing around said tone generator.

13. A process of installing a circular piezoelectric tone generator wafer in a cylindrical piezo tone generator housing comprising a plastic, comprising the steps of:
 a) inserting a tone generator made according to a process comprising;
  1) forming a layer of filler-free bonding agent having a dynamic viscosity of between 800 and 18,000 mPa-s between a metallized carrier plate and a metallized ceramic wafer,
  2) pressing together the carrier plate, bonding layer, and ceramic wafer,
  3) curing the bonding layer catalytically or thermally, and
  4) curing the bonding layer by UV irradiation,
 wherein the quantity of bonding layer applied in step 1) is chosen so that during step 2) a bead covering the edge of the ceramic wafer is formed;
 into a recess of a first half of said housing, wherein each half of the housing has a circular edge, wherein the circular edge of said first half contains said recess, and wherein said first half is provided with a setoff of the other half, b) mounting the other half so that the housing is closed and the tone generator is clamped by the halves of the housing, and c) welding the halves to one another by the action of ultrasound.

14. A piezoelectric tone generator comprising a metallized piezoceramic, a metallic carrier plate larger than the piezoceramic, and a cured bonding layer located between said carrier plate and said piezoceramic, wherein the bonding layer is filler-free, wherein the edge of the ceramic wafer is surrounded by a bead of said bonding layer, wherein the thickness of the bonding layer is of the order of magnitude of the surface roughness of the metallized piezoceramic and carrier plate.

15. A piezoelectric tone generator according to claim 14, wherein said bonding layer comprised prior to curing, a filler-free bonding agent having a dynamic viscosity between 800 and 1,800 mPa-s, and wherein said bonding layer is adjacent to said carrier plate and said piezoceramic.

16. A piezoelectric tone generator according to claim 14, wherein said piezoceramic wafer is circular and has a thickness of between 100 and 300 microns, and said carrier plate is circular and has a thickness of between 50 and 400 microns, wherein the diameter of the ceramic wafer is between 10 and 40 mm and the diameter of the carrier plate is between 12 and 50 mm, with the proviso that the diameter of the metal plate is between 2 and 30 mm larger than the diameter of the ceramic wafer.

17. A piezoelectric tone generator according to claim 15, wherein said bonding layer comprises a single-component bonding agent which comprises a methacrylate resin.

18. A piezoelectric tone generator according to claim 17, wherein said methacrylate resin comprises a urethane methacrylate resin.

19. A piezoelectric tone generator according to claim 15, wherein said bead covers at least 50% of the lateral surface of the ceramic wafer.

20. A piezoelectric tone generator according to claim 15, additionally comprising a housing which has been welded by the use of ultrasound around the tone generator.

* * * * *